United States Patent [19]
Kahn

[11] 3,798,413
[45] Mar. 19, 1974

[54] PROPORTIONAL TEMPERATURE CONTROL DEVICE

[75] Inventor: David Kahn, Harrisburg, Pa.
[73] Assignee: AMP Incorporated, Harrisburg, Pa.
[22] Filed: May 4, 1973
[21] Appl. No.: 357,319

[52] U.S. Cl. ............... 219/210, 219/505, 307/310, 338/23, 338/25
[51] Int. Cl. ............................................ H05b 1/00
[58] Field of Search .......... 219/209, 210, 501, 505, 219/510; 338/22–24; 317/235 Q; 330/23; 310/8.9; 307/310

[56] References Cited
UNITED STATES PATENTS
| | | | |
|---|---|---|---|
| 3,440,397 | 4/1969 | Vesper et al. | 219/501 X |
| 3,322,982 | 5/1967 | Craiglow et al. | 219/210 X |
| 3,419,214 | 12/1968 | Evalds | 219/501 X |

Primary Examiner—C. L. Albritton

[57] ABSTRACT

A device for maintaining a relatively constant temperature in an enclosure has a polyconductor connected in parallel to a first resistance element within the enclosure to be heated. The polyconductor is connected in series to a second resistance element located outside of the enclosure and this circuit is connected to a source of current which will cause the first resistance element to heat the enclosure as current passes therethrough; when the transition temperature of the polyconductor is reached, the first resistance element is shunted by the change in conductive state of the polyconductor and heating thereby is proportionally reduced in order to maintain the temperature within the enclosure at the transition temperature of the polyconductor.

13 Claims, 1 Drawing Figure

PATENTED MAR 19 1974　　　　　　　　　　　　　3,798,413
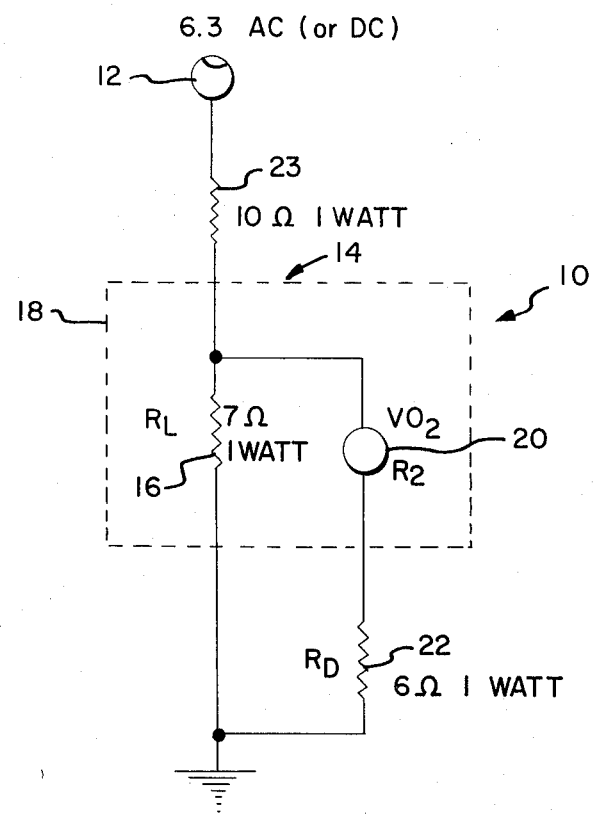

PROPORTIONAL TEMPERATURE CONTROL DEVICE

The present invention relates to a proportional temperature control device and more particularly to a device for maintaining a relatively constant temperature within an enclosure.

Temperature control devices of various types have been previously used for the purpose of maintaining the temperature within enclosures at a selected level. Typically such devices utilize bimetallic strips in order to control operation of a heating element. As a result, the control is based on an "on-off" control function, with a resulting fluctuation in temperature on either side of the desired temperature rather than control of the temperature at the selected or desired level. Moreover, although the technology with respect to bimetallic temperature control device is quite advanced, such devices are still relatively inaccurate in operation and cannot precisely control temperatures to the degree of accuracy required in certain applications.

More specifically, many electronic devices utilize temperature sensitive quartz crystal elements as oscillators. Such elements must be maintained at selected predetermined temperatures in order for them to produce the desired frequency of oscillation. If the temperature surrounding such crystals varies, then the frequency of oscillation produced thereby will also be varied. This is undesirable, particularly in precision electronic equipment such as radios and the like. To overcome the effects of heat fluctuations in the surroundings, such crystals are typically maintained within their own separate enclosure with a controlled heating element used to maintain the selected temperature around the crystal. However, the maintenance of the temperature at the selected temperature level is extremely difficult and previously proposed bimetallic control elements have not been entirely satisfactory for this purpose.

Accordingly, it is an object of the present invention to provide a temperature control element which will maintain the temperature within an enclosure at a relatively constant level.

Yet another object of the present invention is to provide a device for proportionately controlling the temperature within an enclosure.

Another object of the present invention is to provide a relatively simple and inexpensive device for controlling the temperature level in an enclosure.

In accordance with the present invention a temperature control device is provided for maintaining a predetermined temperature level in chamber, and in particular, within a chamber that contains a quartz crystal oscillating element for an electronic device. The control element of the invention utilizes an advantageous feature available in recently developed materials commonly referred to in the art as polyconductors. These polyconductors are made in variety of compositions and have the peculiar characteristic of exhibiting metallic electrical conductivity above and little or no electrical conductivity below a predetermined transition temperature. That is, these materials typically have a relatively high resistance value when their temperature is below their critical transition temperature while, on the other hand, at temperatures above their transition temperature, they have resistance values which are several orders of magnitude lower; for example, one thousandth of their resistance value below the transition temperature. Moreover, the high to low resistance transformation, and the reverse low to high resistance transformation of these materials is achieved simply by varying their temperature and can be repeated an infinite number of times. Another characteristic of these elements is that the transformation from the high to low resistance state occurs relatively abruptly at the transition temperature over a span of approximately 1°C. In the course of this one degree span, the resistance value of the element transforms proportionately to the temperature.

A number of such polyconductors and processes for doping the conductors in order to adjust the desired transition temperature thereof are disclosed in U.S. Pat. Nos. 3,402,131 to Futaki et al. and 3,532,641 to Chamberland. In addition to the polyconductors disclosed in those patents, numerous other types of polyconductors are available, each of which has a transition temperature at which the element abruptly changes its electrical property, being relatively non-conductive below the transition temperature $T_c$, and being electrically conductive above the transition temperature.

In the illustrative embodiment of the present invention these negative temperature-resistance characteristics of polyconductors are advantageously used in combination with a first electrical resistance heating element which is connected to a source of current in order to maintain a constant temperature within an enclosure for a quartz crystal oscillator. The polyconductor is connected in parallel to the electrical resistance heating element and both elements are contained or positioned within the enclosure for the quartz crystal. A source of current is connected through a resistance element to the parallely connected polyconductor and heating resistance element in order to supply current to the heating element to heat the latter in accordance with Joule's law. A second resistance element is connected in series to the polyconductor, but is located outside of the enclosure for the quartz crystal. As a result of this arrangement, the first electrical heating element raises the temperature within the enclosure from ambient as current flows therethrough. Because of the relatively high initial resistance value of the polyconductor element within the enclosure, substantially all of the current passes through the resistance heating element so that heating occurs relatively rapidly. Ultimately, the temperature within the enclosure reaches the transition temperature of the polyconductor and the latter then becomes conductive. As this occurs, less current passes through the heating resistance element, so that its temperature decreases, thereby permitting the interior of the enclosure to cool slightly. The cooling of the enclosure causes the resistance of the polyconductor to increase, causing more current to flow through the resistance heating element thereby increasing the temperature within the enclosure. Thus, there is a cyclic operation between the polyconductor and the heating resistance element which maintains the temperature of the enclosure at a relatively constant level corresponding to the transition temperature of the polyconductor. However, it is noted that because the polyconductor transition from its high resistance to its low resistance state occurs over a span of approximately 1°C, and because the transition is relatively proportional within that one degree span, the control of the temperature within the enclosure is proportional rather than simply "on-off." As a result, the temperature control is proportional at the transition temperature and a relatively level temperature can be maintained within the enclosure.

The above, and other objects, features and advantages of this invention will be apparent in the following detailed description of an illustrative embodiment thereof which is to be read in connection with the single FIGURE of the accompanying drawings which shows a schematic circuit diagram of the temperature control device of the present invention.

As shown in the drawing in detail, a temperature control device 10, constructed in accordance with the present invention, includes a source of current 12 to which a heating and temperature control circuit 14 is operatively connected. Circuit 14 includes a first resistance heating element 16 located within an enclosure 18 (shown in phantom lines in the drawings) which contains a quartz crystal oscillator element (not shown) such as is used in radios or other electronic equipment.

A polyconductor element 20 is electrically connected in parallel to resistance heating element 16 and is located within the chamber 18 adjacent to the resistance element. An additional resistance element 22 is electrically connected in series to the polyconductor element 20, but is located outside of the enclosure 18. The resistance element 22 has a resistance which may be larger or smaller than the resistance value of element 16, for purposes described more fully hereinafter. Finally, the polyconductor 20 and the resistance element 16 are connected to current source 12 through an additional resistance element 23 which is also located outside of enclosure 18.

Polyconductor 20 preferably is formed of a material selected as any one of any of the materials in the group of polyconductor materials exhibiting a negative temperature-resistance characteristic wherein the material abruptly transforms from a semi or non-conductive state to an electrically conductive state at or above a transition temperature. The term polyconductor as used in this application and in the following claims is intended to mean any material exhibiting this desirable characteristic, i.e. exhibiting an abrupt transition between a relatively non-metallic conductivity to metallic conductivity at a specific temperature. This abrupt transition normally takes place within a relatively small temperature range of approximately 1°C, and the transition within that one degree span is proportional to the temperature variation within the span.

Materials within the definition or the term polyconductor as used in this specification that exhibit these characteristics include, but are not limited to $VO_2$, $V_2O_3$, $V_4O_7$, $V_5O_9$, $V_6O_{11}$, $V_8O_{15}$, $V_6O_{13}$, $Ti_2O_3$, $Ti_3O_5$, $Ti_5O_9$, $NbO_2$, $Fe_3O_4$, $NiS$, $CrS$, $FeS$, $FeSi_2$, $CrN$. Each of these materials exhibits the negative temperature-resistance characteristic, i.e. the transition between relatively non-conductive and relatively conductive states at different transition temperatures $T_C$. Typically, the polyconductor 20 is formed from crystals of these materials in the shape of a disk or cylindrical rod having electrical contacts secured to opposite ends or sides thereof for electrically connecting the polyconductor to the circuit.

In the illustrative embodiment of the present invention polyconductor 20 is formed of $VO_2$ and has a transition temperature within the range of 10°C to 80°C. The specific transition temperature can be selected or adjusted by doping the $VO_2$ material with metals or fluoride in the manner described in the above-identified patents. Preferably, the polyconductor has a resistance value below its transition temperature which is substantially higher than the resistance value of resistance heating element 16. This resistance value may also be adjusted, without effecting the transition temperature of the polyconductor, by adding or mixing with the polyconductor materials small amounts of a material such as carbon or carbon compounds. The added material will increase the conductivity of the polyconductor below its transition temperature; thus the resistance value of the polyconductor can be adjusted as desired by adding more or less of the carbon compound material as required. However, the resistance value is preferably selected such that below the transition temperature of the polyconductor the total of the polyconductor resistance and the resistance of resistor 22, outside of the chamber 18, is substantially greater than the resistance value of the resistance heating element 16; while on the other hand, above the transition temperature this total is comparable to or approximately the same as the resistance value of the heating resistor 16.

By selecting the respective resistance values of the elements in this manner, when current from source 12 is supplied to circuit 14, through a switch or the like (not shown) the current will initially flow through resistance element 16, causing the same to be heated in accordance with Joule's law and thus raising the temperature within chamber 18. Substantially all of the current will pass through the resistance element 16 because of the high resistance value of polyconductor element 20 below its transition temperature. However, once the transition temperature of the polyconductor element is reached, the polyconductor will switch to its high conductivity or low resistance state, so as to shunt the resistance element 16. As a result, there will be a substantially smaller current flow through the element 16, and that element will produce less heat and will decrease in temperature. The temperature within the chamber 18 will then correspondingly decrease, causing polyconductor 20 to revert to its high resistance value and the heating element to increase in temperature. Accordingly, a control cycle is provided by the combination of the polyconductor and heating resistance element 16 in the manner shown in the drawing, so that the temperature within the chamber 18 is held at the transition temperature of the polyconductor.

An advantageous feature of the present invention is the fact that the relatively abrupt transition of the polyconductor from its high conductivity state to its low conductivity state occurs over a temperature span of approximately 1°C, and in that temperature span the change in resistance value of the polyconductor is proportional. As a result, the control of heat produced by resistor 16 is proportional, rather than a simple "on-off" control of the resistor as would be the case with a conventional switch or bimetallic element. That is, once the temperature within chamber 18 reaches the transition temperature of the polyconductor, the resistance of the polyconductor over the 1°C span decreases proportionately to further increase in temperature. As the conductivity of the polyconductor decreases in this manner, the current flow through the resistor 16 also decreases proportionately, thereby proportionately reducing the amount of heat provided by that element. As the temperature within chamber 18 falls because of the smaller amounts of heat produced by resistance element 16, the polyconductor resistance proportionately increases, causing increased heat to be produced by the element 16, raising the temperature within the enclosure 18. This fluctuation in the resistance value of polyconductor 20 and the heat produced by resistance element 16 will occur within this 1°C span of the resistance transition of the polyconductor so that the temperature within the enclosure 18 is controlled and maintained at that level, i.e. within the 1°C span of the transition of the polyconductor. Accordingly, the temperature within the enclosure is held relatively constant and the wide fluctuations in temperature which occur with previously proposed devices is avoided.

In one illustrative embodiment of the present invention which has been produced and tested, a satisfactory operating temperature control device has been provided wherein the voltage source 12 provided a voltage of 6.3 volts, while resistance 16 had a resistance value of 7 ohms and resistance 22 had a value of 6 ohms. In that embodiment of the invention the polyconductor was formed as a disk of $VO_2$ crystallites having a surface area on opposite sides thereof of approximately two millimeters square and a resistance value at temperatures below $T_C$ of 700 ohms. In addition the resistance 23 had a value of 10 ohms. Because of the transition characteristics of the $VO_2$ polyconductor, the polyconductor in this embodiment had a resistance value above the transition temperature such that the sum of its resistance value and the resistance value of resistor 22 was less than the 7 ohm resistance value of resistor 16 above the transition temperature. In this connection, the resistance value of resistor 22, as mentioned, may be higher or lower than the value of resistor 16. The specific value selected is chosen to control a desired rate of heat production by resistor 16. Thus, the higher the resistance value of resistor 22, the higher the rate of heat produced by resistor 16, above $T_C$, since more current will flow through resistor 16. On the other hand, decreasing the value of resistor 16 will decrease the rate of heat production by resistor 16, above $T_C$, since the current flow through resistor 22 will be decreased.

Accordingly, it is seen that a relatively simple and inexpensively manufactured device is provided which products an accurate control of temperature within an enclosure. The device can be used over a wide range of voltages and currents, with the values of the resistors and the type of polyconductor used being varied accordingly in order to achieve the desired results. The polyconductor acts as a proportional control device which proportionately controls the amount of heat produced by resistor 16 within the enclosure 18 in order to maintain the temperature within the enclosure at a relatively constant level. The polyconductor thus acts somewhat as a switch, but uses no moving parts in order to produce the desired results. Accordingly, the device has a relatively long life and is extremely durable in use while accurately controlling the desired temperature. Therefore, it is particularly adapted for many applications where it is necessary to accurately maintain the temperature within an enclosure at a specific level over an extended period of time.

Of course, it is also to be understood that while the present invention has been described particularly for use in maintaining the temperature of an enclosure for a quartz crystal oscillator, it can be used in other applications wherein a specific temperature level is to be maintained.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A proportional temperature control device adapted to be connected to a source of current to produce a temperature control cycle for maintaining the temperature in an enclosure at a relatively constant level, said device comprising a first electrical resistance element in said enclosure for heating the interior of the enclosure when connected to said source of current, a polyconductor connected in parallel with said first electrical resistance element in said enclosure, and a second resistance element located outside of said enclosure and connected in series with said polyconductor whereby, when said first resistance element is connected to said source of current said first resistance element is heated, in accordance with Joule's law, thereby raising the temperature within said enclosure and of said polyconductor until the transition temperature of the latter is reached, whereupon said polyconductor becomes increasingly conductive and increasingly shunts said first resistance element to permit said first resistance element, said enclosure and said polyconductor to cool, thereby increasing the resistance of the polyconductor and allowing said first resistance element to produce increased heat and repeat the temperature control cycle; said second resistance element having a resistance value which is less than that of said first resistance element, and said polyconductor being selected to have a resistance value below its transition temperature which is substantially higher than that of said first resistance element and a resistance value above its transition temperature which is at least several orders of magnitude less than its higher resistance value whereby the sum of the resistances of said polyconductor and said second resistance element above said transition temperature is comparable to the resistance value of said first resistance element.

2. The device as defined in Claim 1 wherein the transition of said polyconductor from its high resistance value to its low resistance value is abrupt, occurs over a temperature span of approximately 1°C, and is proportional within that span, whereby the shunting of said first resistance element is proportional within said span to proportionally control the production of heat by said first resistance element and thereby maintain the temperature in said enclosure at a relatively constant level substantially equal to the transition temperature of said polyconductor.

3. The device as defined in claim 2 wherein said polyconductor is formed of $VO_2$.

4. The device as defined in claim 2 wherein said polyconductor has a transition temperature within the range of 10°C to 80°C.

5. The device as defined in claim 4 wherein said first resistance element has a value of 7 ohms, said second resistance element has a value of 6 ohms and said polyconductor has a resistance value of 700 ohms below its transition temperature.

6. A proportional temperature control device for maintaining a predetermined temperature in a chamber comprising, a source of current, an enclosure defining a chamber to be heated, a first electrical resistance element positioned within said chamber and electrically connected to said source of current, a polyconductor and a second electrical resistance element electrically connected in series to each other and connected in parallel to said first resistance element, said second resistance element being located outside of said chamber and said polyconductor being located inside of said chamber and formed of a polyconductive material having the characteristic that its electrical resistance value at temperatures below a predetermined transition temperature is at least several orders of magnitude larger than its resistance value at temperatures above said transition temperature, said material being selected to have a resistance value below its transition temperature which is substantially higher than the resistance velue of said first resistance element and to have a transition temperature which is the same as the temperature which is to be maintained in said enclosure, with the transition in resistance thereof occurring relatively abruptly at said transition temperature over a temperature span of approximately 1°C whereby current supplied to said first resistance element from said current source heats said first resistance element in accordance with Joule's law until the temperature in said chamber reaches said transition temperature at which point said polyconductor becomes increasingly conductive and proportionally shunts said first resistance element over said 1°C span thereby to proportionally control heat production by said first resistance element and maintain said predetermined temperature in said chamber.

7. The device as defined in claim 6 wherein said second resistance element has a predetermined resistance value and said polyconductor has a low resistance value above said transition temperature wherein the sum of the resistances of said polyconductor and said second resistance element above said transition temperature is approximately the same as the resistance value of said first resistance element.

8. The device as defined in claim 6 including a third resistance element located outside of said enclosure and connected in series between said current source and said first resistance element.

9. The device as defined in claim 6 wherein said polyconductor has a transition temperature within the range of 10°C to 80°C.

10. The device as defined in claim 9 wherein said polyconductor is formed of $VO_2$.

11. The device as defined in claim 10 wherein said current source comprises a 6.3 volt source, said first resistance element has a value of 7 ohms, said second resistance element has a value of 6 ohms, and said polyconductor has a resistance value of 700 ohms below its transition temperature.

12. The device as defined in claim 7 wherein the resistance value of said second resistance element is less than the resistance value of said first resistance element.

13. The device as defined in claim 7 wherein the resistance value of said second resistance element is greater than the resistance value of said first resistance element.

* * * * *